Sept. 7, 1954      L. A. PARADISE      2,688,284
BALER WITH INTERMITTENTLY ACTIVE SLICING KNIFE
Filed April 7, 1950      2 Sheets-Sheet 1
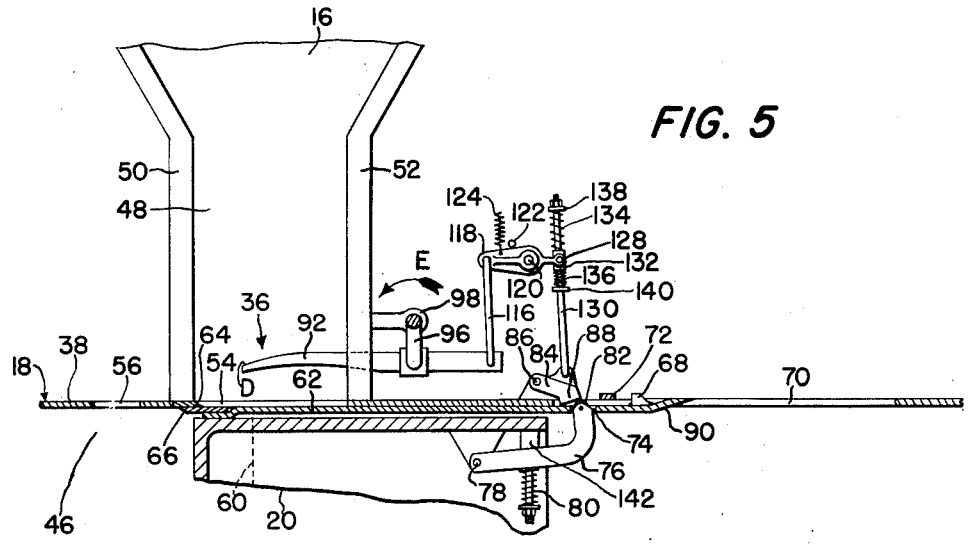
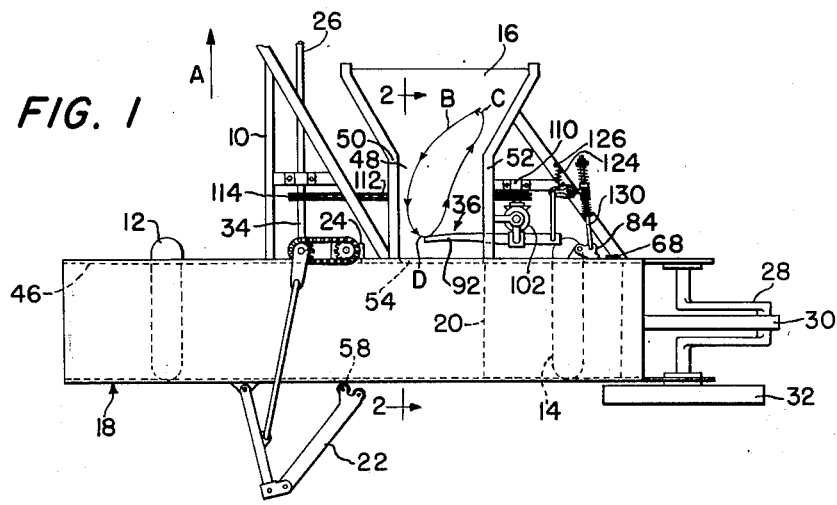
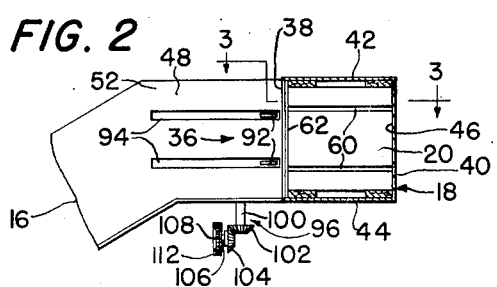
INVENTOR.
L. A. PARADISE
ATTORNEYS Sept. 7, 1954  L. A. PARADISE  2,688,284
BALER WITH INTERMITTENTLY ACTIVE SLICING KNIFE
Filed April 7, 1950  2 Sheets-Sheet 2

INVENTOR.
L. A. PARADISE
ATTORNEYS

Patented Sept. 7, 1954

2,688,284

UNITED STATES PATENT OFFICE 2,688,284

BALER WITH INTERMITTENTLY ACTIVE SLICING KNIFE

Louis A. Paradise, Moline, Ill., assignor to Deere & Company, Moline, Ill., a corporation of Illinois Application April 7, 1950, Serial No. 154,629

6 Claims. (Cl. 100—45)

This invention relates to a material-handling machine and more particularly to such machine as embodied in a baler for the baling of hay, straw and like material.

Although the principles of the invention have relatively wide application, the preferred embodiment of the invention to be disclosed herein was designed primarily to serve as a basis for improvement in hay and straw balers of the general type known today. Such baler is designed for travel over a field on which cut hay, straw or like material is lying, to pick up such material and to deliver it to a baling chamber in which it is formed into successive bales ultimately tied and discharged onto the ground to be subsequently picked up and stored and otherwise disposed of.

A baler of the type referred to will have a baling chamber, usually provided by means of a plurality of walls arranged so that the chamber is rectangular in cross section. One of the vertical walls of the chamber will have a feed inlet opening therein through which material may be fed into the chamber from the material-pickup means that operates in advance of the bale chamber to pick up the material from the field. A plunger or equivalent bale-forming means operates in the chamber to receive material fed through the inlet opening and to compact or compress this material by successive charges into a bale of predetermined size governed by measuring means operative in response to increase in length of the bale as successive charges of material are compacted. After the bale attains such predetermined length, the measuring means energizes tying mechanism effective to bring one or more loops of wire or twine about the bale to bind or tie and thus to complete the formation of the bale.

In balers of the fully automatic type in which wire or twine is automatically fed to the tying mechanism without the assistance of manual labor, it is desirable that the tying operation be conducted without stopping either forward travel of the machine or without modifying the operation of the plunger or equivalent bale-forming means. During the tying operation, the intermittently active tying mechanism needles and the continuously active plunger will be simultaneously present in a certain zone of the bale chamber, but this conflict is easily resolved by recessing or slotting the plunger to accommodate the tying mechanism needles so that the plunger may operate without causing damage to or interfering with the operation of the needles. However, there is a further operational characteristic incident to completion of the bale that has heretofore been given little attention. This is the operation of the severing means or slicing knife for severing the material as it is fed through the feed inlet opening into the chamber. This severing means has heretofore consisted of a movable knife fixed to the plunger and reciprocable with the plunger across the feed opening so as to slice or sever successive charges of material fed to the chamber. As long as the knife operates in the vertical wall of the chamber in which the inlet opening is provided and the needles are projected across the chamber in planes parallel to said wall, there will be no conflict between the needles and the knife. On the other hand, it is found desirable, for reasons to be pointed out below, to operate the tying mechanism needles in horizontal planes. Since the feed opening is in a vertical plane, the slicing knife will operate in a vertical plane and obviously a knife carried by the plunger would have to be slotted if conflict with the needles would be avoided. However, it will be readily seen that slotting of the knife would destroy much of its severing function. Hence, other means must be provided to utilize the desired design without sacrificing any of the operational efficiency of the baling mechanism.

Among the reasons for operating the needles in a horizontal plane is the lowering of the overall height of the baler, since heretofore the vertically operated needles were projected upwardly from below the bale chamber. Another reason is to improve the type of bale formed. Behind this reason is the underlying principle that the conventional bale chamber in section is slightly rectangular rather than a perfect square and it is desirable to move the needles across the shorter dimension of this rectangle. Hence, when the needles operate vertically, the shorter dimension of the bale chamber must be vertical, with the result that the longer dimension is horizontal, thus requiring feeding mechanism that will travel through a greater distance. According to the present invention, the bale chamber may be designed with its shorter dimension horizontal, thus lending itself to improved feeding and at the same time adapting itself to horizontally operating needles which retain the characteristic of tying the bale across its shorter dimension.

It is an important object of the present invention to achieve the advantages outlined above by the provision of a slicing knife that is confined in operation to a zone outside the zone through which the tying mechanism needles travel. It is an important object to disconnect the knife from its conventional fixed position on the plunger, whereby the plunger can travel into the zone of the needles without taking the knife with it. At the same time, it is desirable to impart driving force to the knife by means of the plunger. For this purpose, the invention provides disconnectible driving means between the knife and plunger, which means normally leaves the knife disconnected from the plunger until a certain phase in the baling operation is reached, following which the knife is connected to the plunger for operation through a severing cycle which terminates short of the tying zone, the means being effective to again disconnect the knife from the plunger so that the plunger may continue into the tying zone without the knife. A related object pertains to the control of the driving means between the knife and plunger in response to certain operational characteristics of the feeding means. Specifically, the knife is provided as part of a door or closure means having a normally idle position closing the feed opening but operative in response to the accumulation of a predetermined quantity of material by the feeding means to be displaced to an open position so that the material is forced through the opening into the baling chamber substantially simultaneously with connection of the knife to the plunger so that this material can be severed at the feed opening. A further object of the invention is to provide an improved design that can be readily adapted to certain known types of balers.

An important object of the invention is to provide improved feeding means operative to feed material to the chamber and having a feed element whose cycle of movement is outside the chamber.

The foregoing and other important objects and desirable features inherent in and encompassed by the present invention will become apparent as a complete disclosure of a preferred embodiment of the invention is made in the following detailed description and accompanying sheets of drawings in which Figure 1 is a plan view of a typical baler embodying the principles of the invention;

Figure 2 is a transverse sectional view taken substantially on the line 2—2 of Figure 1;

Figure 5 is a similar view showing return of the knife and closure means toward closed position.

Figure 3:
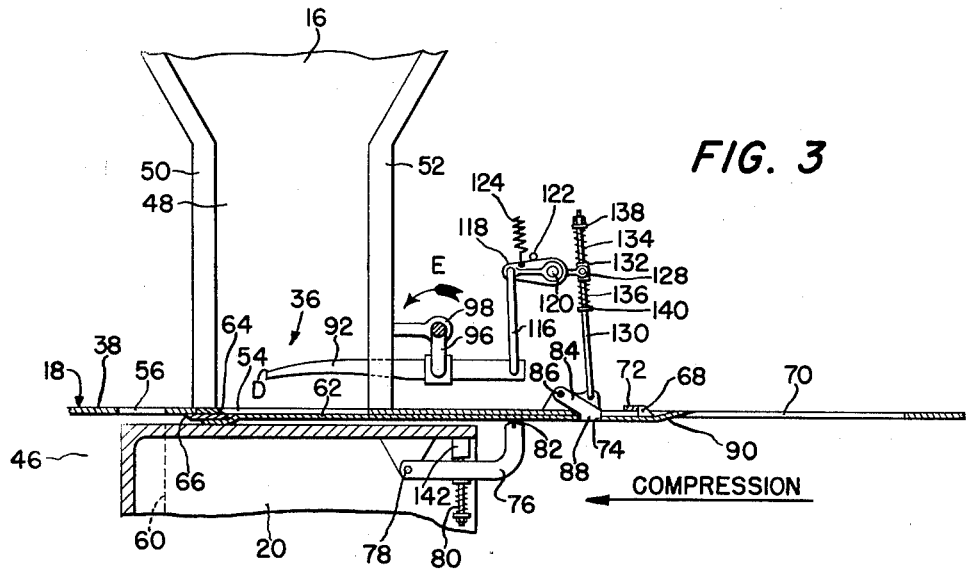
Figure 3 is an enlarged fragmentary sectional view, taken generally along the line 3—3 of Figure 2, and showing the normally idle position of the combined closure and severing means.

The baler chosen for purposes of the present disclosure is illustrated rather schematically in Figure 1, since familiarity with baler constructions in general is assumed. The general design may follow somewhat that forming the subject matter of U. S. Patent 2,484,890, granted to Hill, October 18, 1949.

The baler shown has a main frame 10 rendered mobile by a pair of transversely spaced wheels 12 and 14 for advance over a field in the direction of the arrow A so that a pick-up means 16 may operate to pick up hay, straw or like material for delivery rearwardly to a transversely disposed elongated bale case 18 in which bales are formed by a reciprocating plunger 20 and tied by intermittently active tying mechanism needles 22 (only one of which appears in the drawings) cooperative with tying mechanism contained in a gear box 24 at the side of the bale case opposite to that at which the needles 22 are carried.

The baler is adapted to be drawn by a tractor (not shown) or other draft source of the type having a power take-off shaft which may be connected to a longitudinally extending power input shaft 26 which in turn may ultimately transmit power to a crankshaft 28 and pitman 30 for reciprocating the plunger 20. One end of the crankshaft carries a conventional flywheel 32. The tying mechanism 22—24 may be driven in any suitable manner by an extension 34 of the input shaft 26. Any form of intermittently operative drive means may be utilized for this purpose, such as shown in the patent identified above.

The input shaft 26 serves further to drive, by means that will be described in detail below, feeding means 36 associated with the pick-up means 16 to accomplish the feeding of material into the interior of the bale case 18.

The material-receiving means comprising the bale case 18 is made up of a plurality of walls (Figure 2) including front and rear walls 38 and 40 and top and bottom walls 42 and 44, which form an elongated material-receiving or baling chamber 46. The pick-up means 16 includes a relatively narrow, horizontal throat portion 48 adjoining the front wall 38 of the bale case and delineated at opposite sides by vertical longitudinally extending side walls 50 and 52. The front wall 38 of the chamber 46 is provided with a rectangular feed inlet opening 54 in alinement with the throat 48. The feeding means 36 operates to feed material into the chamber 46 via this opening.

The front wall 38 of the bale case is provided with a pair of small openings 56 (only one of which is shown) and the rear wall 40 of the bale case is provided with a pair of corresponding openings 58 (only one of which is shown; Figure 1). These openings are in horizontal longitudinal alinement and serve to accommodate the needles 22 as the needles move from rear to front in horizontal planes across the bale chamber 46, the needles first entering the rear openings 58 and then passing through the front openings 56 into the tying mechanism gear box 24. The arrangement just described may be used when the bales are tied with wire, as shown in U. S. Patent 2,458,318 granted to Tuft, January 4, 1949. U. S. Patent 2,484,890, previously identified above, illustrates a representative form of tying mechanism for the utilization of twine in tying the bales. Basically, it is immaterial which type of tying mechanism or which tying medium is used, since the principles of the present invention are applicable in any case. Since these details are relatively unimportant here, and since they are available in the patents referred to, they will be only generally covered in the present description.

Figure 4:
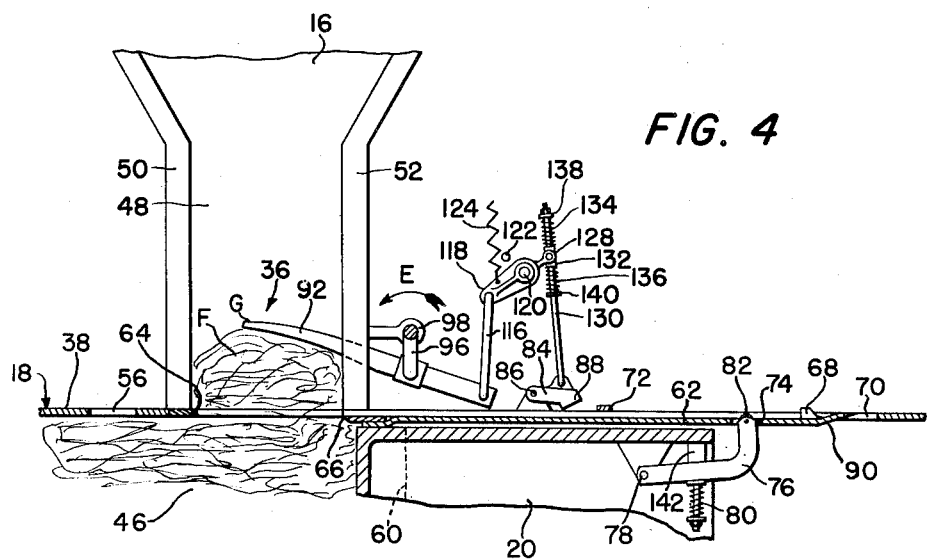
Figure 4 is a similar sectional view showing a subsequent stage in the operation in which the knife and closure means is moved to opened position.

It will be seen from an examination of Figures 3, 4 and 5 that the presence of the needles in tying position (extended through the openings 58 and 56) would conflict with the presence of the plunger 20 when the plunger is at the end of its compression stroke as shown in Figure 3. However, this conflict is resolved in the conventional manner by providing in the leading face of the plunger a pair of recesses or slots 60 for accommodating the needles. Hence, the plunger may continue to operate without damaging or affecting the operation of the tying mechanism.

The operation of the material-handling machine or baler to the extent described may be briefly summarized as follows: The baler is propelled over the field in the direction of the arrow A, the pick-up 16 serving to collect or gather material from the ground and to advance it to the throat 48 of the inlet, in which zone the material is moved by the feeding mechanism 36 through the feed opening 54 (assumed for present purposes to be open) and into the bale chamber 46. Successive charges of material fed to the chamber are engaged and compacted by the reciprocating plunger 20, so that ultimately a bale of desired length is formed. Bale-measuring means of any conventional form (not shown) may be utilized to initiate operation of the tying mechanism, whereupon the needles 22 move forwardly across the bale case to the cooperative parts of the tying mechanism contained in the tying mechanism housing 24. Because of the slots or recesses 60 in the leading face of the plunger, the simultaneous presence of the needles and plunger in the same zone occurs without difficulty. Except for the disposition of the needles 22 for operation in planes normal to the plane of the wall in which the feed opening 54 is provided, the operation as briefly described above is not materially different from that obtainable in known balers.

Another of the important changes (apart from the disposition of the needles) effected by the present invention is the provision of feed-opening-control means. In the instant case, this control means takes the form of a closure element or door 62 carried between the inner surface of the front bale case wall 38 and the front surface of the plunger 20. The arrangement is such that the door 62 has sliding movement back and forth lengthwise of the bale case so as to be selectively positionable or changeable between first and second positions. In its first position as shown in Figure 3, the door 62 closes or restricts the feed opening or inlet 54. In its second position as shown in Figure 4, the door 62 occupies an open status in which the restriction or obstruction to the feed opening or inlet is removed.

In addition to its function of controlling the feed opening or inlet, the door 62 operates as a material-severing means in conjunction with a vertical knife or cutter member 64 fixed along that vertical edge of the feed opening 54 more remote from the plunger when the plunger is at the end of its retracting stroke (the retracted position of the plunger 20 is shown in Figure 4). The front edge of the door 62 carries a cooperating knife or cutter member 66 which, when the door moves to closed position (Figures 3 and 5) occludes with the fixed knife 64, functioning to slice or sever material fed through the feed opening 54.

The door 62 is preferably formed as a plate somewhat longer than the plunger 20. When the plunger 20 is at the end of its compression stroke and when the door 62 is in closed position (Figure 3) the right-hand end of the door projects beyond the right-hand end of the plunger. This end of the door is provided with stop means 68, which may consist of one or more lugs projecting forwardly through an appropriate number of suitable slots 70 in the bale case front wall 38. The stop means 68 is cooperable with a fixed stop 72 carried by the bale case front wall, the stop means being cooperative to determine the maximum position of the door when closed (Figure 3). The slot means 70 is, of course, long enough to accommodate the stop means 68 when the door 62 moves to its fully opened position as shown in Figure 4.

Drive means is provided for intermittently driving or changing the position of the door 62 by means of power derived from the plunger 20. This drive means comprises a pair of selectively connectible and disconnectible parts or elements, here shown as taking the form of an opening or recess 74 provided in the door adjacent its right-hand end and a cooperating coupling member 76 carried at the right-hand end of the plunger 20. There may, of course, be a plurality of openings 74 and a corresponding plurality of coupling members 76. However, for the present purposes, it may be assumed that a single set of drive means will function satisfactorily.

The coupling member 76 is pivoted at 78 to an interior portion of the plunger 20 and is appropriately spring-loaded by any suitable means, as at 80, so that a roller 82 carried at its outer end is constantly urged toward or conditioned for engagement with the opening 74 in the door 62.

When the door 62 is in the closed position as shown in Figure 3, the stop means 68—72 fixes the position of the door so that the cutting edge on the door knife 66 is located to the right of or outside the zone through which the tying needles 22 pass. At the same time, the leading face of the plunger 20 is, when the plunger is at the end of its compression stroke (Figure 3), considerably past or to the left of the knife 66, hence entering the needle zone. However, this characteristic is accommodated by the recesses or slots 60 provided in the leading face of the plunger as described above. It may be important to note at this point that since the knife 66 is stopped in the position shown in Figure 3, the knife need not be slotted to accommodate the needles. Hence, the knife has maximum severing or slicing efficiency.

The closed position of the door 62 is maintained and the door is held against movement to the right by releasable retaining means, here in the form of a latch 84 pivoted at 86 to the outer or front side of the front bale case wall 38 and having a lug portion 88 receivable in the opening 74 in the door 62. As shown in Figure 3, the lug portion 88 has an inner surface which, when the lug is received by the door opening 74, is substantially flush with the inner surface of the door. Stated otherwise, the lug 88 on the latch 84 substantially fills the opening 74 and provides means for preventing engagement between the opening 74 and the roller 82 on the coupling member 76. Therefore, as the plunger moves on its retracting stroke, the roller 82 will ride along the inner surface of the door 62, passing over the lug-closed opening 74, and off the right-hand end of the door 62, which is provided as a ramp 90 for the purpose of accommodating the roller 82. A comparison of the closed position of the door 62 in Figure 3 and the retracted position of the plunger 20 in Figure 4 will indicate the extent to which the retracted plunger moves to the right of the right-hand end of the closed door. When the plunger again returns on its compression stroke, the roller 82 will ride up the ramp 90 and will again travel along the inner surface of the door 62 and back to the position of Figure 3. In short, the driving means 14—76 is always disconnected as long as the opening 74 is filled by the lug 88 on the control latch 84.

According to the present invention, whether or not the driving means 74—76 is energized to couple the plunger 20 and door 62 depends upon whether certain conditions obtain in connection with feeding of the material toward the baling chamber 46 in the path defined by the feed throat 48 for ultimate passage through the feed or inlet opening 54. An understanding of the actuation of the control latch 84 in response to conditions affecting the feeding mechanism 36 will require first an understanding of the structure and operation of the feeding mechanism. In so far as concerns the relationship between the feeding mechanism 36 and the drive means 74—76, either element in the combination may be replaced by suitable equivalents; hence, the specific structures in either case need not be slavishly followed. Therefore, in this respect, what is illustrated may be considered to be merely representative. On the other hand, as will be set forth more fully below, there are certain features inherent in the disclosed feeding mechanism that are inventively important as improvements in feeding means in general. For the present, the relationship between the feeding mechanism 36 and drive means 74—76 will be considered.

The feeding mechanism illustrated comprises a pair of feeder elements or packers 92 spaced apart in parallel horizontal planes and projecting respectively through slots 94 formed in the right-hand wall 52 of the feed throat 48. Fundamentally, the packers and the operational characteristics thereof to a certain extent follow fairly well known packer constructions. A representative example of the prior art in this respect is contained in U. S. Patent 2,059,316 granted to Crumb et al., November 3, 1936. In the present instance, the two packers are preferably identical and similarly arranged. For the purpose of simplification, the feeding mechanism may be considered to have but a single packer. This packer and the driving mechanism therefor are designed so that that end of the packer within the feed throat 48 operates in a defined cycle or closed path B (Figure 1). Opposite end portions of this cycle or path are designated respectively C and D in Figure 1 and denote extreme positions of the packer 92. When the packer is at position C, it is accepting material from the pick-up means 16, from which position the packer moves to its maximum or material-delivery position at D, and thence returns to position C etc., in a preferably continuous cycle.

The mechanism for driving the packers 92 through the path or cycle B just described comprises a single throw crank 96 having its axis of rotation disposed vertically and outside the feed throat side wall 52. The journals of the crankshaft 96 may be suitably carried in appropriate bearings as at 98. The lower crank journal is continued downwardly as an integral shaft extension 100 to which is keyed a bevel gear 102 in constant mesh with a bevel gear 104 keyed to a short longitudinally extending shaft 106 to which is additionally keyed a driving sprocket 108 (Figure 2). The short shaft 106 may be suitably journaled as at 110 (Figure 1), and a drive chain 112 is trained about the sprocket 108 and about a driving sprocket 114 keyed to the input shaft 26. The drive is so arranged that the crankshaft 96 is continuously rotated in the direction of the arrow E (Figures 3, 4 and 5).

The particular path or cycle B for the packers 92 is obtained by journaling of the packers intermediate their ends on the throw of the crankshaft 96 and by controlling the outer ends of the packers by control link means 116. Assuming that only a single link 116 is used: This link is connected at one end to the packers, the outer ends of which may be assumed to be combined for effecting this connection. The other end of the link is connected to the free end of an arm 118 that is pivoted at 120 for intermittent fore and aft swinging or displacement about a vertical pivot axis. For the moment, the arm 118 may be considered to be a rigid anchor for the pivotal connection thereto of the link 116. Then, as the single throw of the crankshaft 96 rotates through the circle and in the direction of the arrow indicated, the outer end of the packer will swing in an arc about the pivotal connection 116—118, the radius of this arc being determined, of course, by the length of the link. This mechanism causes the inner or material-engaging end of the packer to travel in the path or cycle B. If it be assumed that the door 62 is open, the packer in traveling through its cycle will receive material and deliver it toward the chamber, the packer being limited in its travel toward the chamber to the maximum position D, from which position material is propelled toward and discharged to the baling chamber 46.

However, as will be set forth immediately below the feeding mechanism has certain important characteristics constituting, as mentioned briefly above, improvements in feeding mechanisms in general and improvements in combination with the intermittently movable door 62. These characteristics will now be described.

The arm 118 is normally maintained in the position of Figure 3 and against a stop 122 by force-applying means, here in the form of a relatively strong tension spring 124 which serves as yielding means capable of storing energy. When no material is being fed from the pick-up 16 to the feed throat 48, the spring 124, which may be anchored to a frame member as shown at 126 in Figure 1, holds the arm 118 against the stop 122. The door 62 is closed and the latch arm 84 is in position so that the lug 88 thereon fills the opening 74 in the door. As the baler travels forwardly over the field and the pick-up 16 begins to accumulate material, this material is moved rearwardly to be engaged by the packers 92 as they move in their cycle past the position C. As the packers continue toward the bale case, the material is moved through the feed throat 48 and against the closed door 62. The material is, of course, relatively resilient and, depending upon the quantity accepted by the packers, will be preliminarily compacted to a certain extent because of the restriction or obstruction imposed by the closed door. As the packers continue to accumulate material against the closed door, the mass of material increases, and the density thereof increases correspondingly, until there is such quantity or accumulation of material, as at F in Figure 4, as to prevent travel of the packer 92 to its maximum delivery position D. In other words, the packer is temporarily stopped at a position G more remote than the position D from the feed opening 54. Stated otherwise, the material-engaging portion of the packer is caused by the accumulation of material F to be displaced outwardly or in a direction opposite to the direction of feeding. The accumulation of material at F between the closed door 62 and the displaced packer 92 serves temporarily as a fulcrum and causes the packer 92 to pivot about its bearing on the crank throw of the crank 96, which results in displacement of the outer end of the packer in a direction toward the bale case front wall 38. Such displacement operates through the link 116 to swing the arm 118 in said direction, thus loading the energy-storing means comprising the tension spring 124.

The arm 118 includes a lever extension in the form of a bifurcated arm 128 for effecting connection with a control link 130 which is in turn pivotally connected to the latch arm 84. The connection between the link 130 and the extension lever 128 comprises a collar 132, a pair of opposed springs 134 and 136 encircling the link 130 at opposite sides of the collar, and a pair of fixed stops in the form of washers 138 and 140 on the link 130. Thus, displacement of the feeding mechanism components and linkage associated therewith causes withdrawal of the latch arm lug 88 from the opening 74 in the door 62. The retaining function of the latch arm is temporarily interrupted, as is its function in filling the door opening 74. Therefore, as the plunger 20 returns on a retracting stroke, the roller 82 may drop into the opening 74 (because of the spring loading at 80), and the door 62 will be moved to its opened position as shown in Figure 4.

With respect to the illustration in Figure 4, attention is directed to the fact that this figure illustrates the operational characteristics of the mechanism just as the door 62 is opened and just before the accumulation of material at F is propelled into the bale chamber 46 through the feed opening 54. It should be understood that as soon as the obstruction or restriction heretofore caused by the closed door 62 is removed, the spring 124 acting on the arm 118 functions to impart a force of considerable amplitude and speed to the packer 92, pivoting the packer in a counter-clockwise direction about the pivot of the packer to the crank throw, giving what may be called a fairly rapid and forceful snap action for effecting delivery of material to the bale chamber as the material-engaging portion of the packer 92 moves from position G to position D. Further in this respect, it should be noted that the maximum position at D of the packer 92 is relatively close to but still outside the bale chamber 46. This is in contradistinction to known structures in which the packer fingers move into and then out of the bale chamber, a design necessitating the provision of slots or openings to accommodate such movement, which slots or openings so materially weaken the bale case as to require costly reinforcements if the baler is to function properly without twisting of the bale case.

As the plunger 20 reaches the end of its retracting stroke as shown in Figure 4, and hesitates momentarily before beginning its compression stroke, the inertia of the moving door 62 does not carry the door farther to the right, because of the coupling effected at 74—76. As the plunger starts back on its compression stroke, the drive means 74—76 remains energized or connected until the plunger and door 62 reach substantially the position shown in Figure 5. As the accumulation of material at F is snapped into the bale chamber 46 through the unobstructed feed opening 54, the packer 92 resumes its normal operating position and the spring 124, of course, restores the arm 118 to the position of Figures 3 and 5. However, since the door 62 has moved to the right, the opening 74 therein is no longer in alinement with the lug 88 on the latch arm 84. Hence, the lug 88 merely projects through the slot 70 in the bale case front wall 38 and rides on the outer surface of the door 62. At the same time, the spring 136 is compressed to apply a slight pressure to the link 130 and hence to the latch arm 84, thus urging the latter toward a position for reengagement with the opening 74 when the opening and the latch arm again become alined.

An important aspect of the invention is the disconnection of the driving means 74—76 prior to the attainment by the plunger 20 of the end of its compression stroke. Stated otherwise, the disconnection occurs just after the knives 64 and 66 accomplish their severing or slicing function and just before the door 62 is stopped in its closed position by the stop means 68—72 (the position illustrated in Figure 3). This result is achieved as illustrated in Figure 5. As the plunger 20 and connected door 62 approach the position illustrated in Figure 5, the roller 82 projecting through the opening 74 in the door encounters the lug 88 on the latch arm 84. In this phase of the operation of the latch arm 84, the lug 88 serves as a ramp for driving or camming the roller 82 out of the opening 74. Hence, a complete power couple is effected between the plunger 20 and door 62 of sufficient strength to withstand the load imposed on the knife 66 as it cooperates with the fixed knife 64. Yet, this couple is disconnectible shortly thereafter. The disconnection of the couple or drive means 74—76 also occurs shortly prior to engagement of the stop 68 on the door 62 with the fixed stop 72 on the bale case front wall 38. Substantially simultaneously with the disconnection of the driving means by forced withdrawal of the roller 82 from the opening 74, the lug 88 on the latch arm 84 is expected to enter the opening 74. No particular refinement of adjustment is required, for inertia of the moving door 62 will carry the door to the left until the stop means 68—72 becomes effective. As the plunger 20 continues to the left to the end of its compression stroke as shown in Figure 1, pressure exerted by the spring 136 on the link or rod 130, having heretofore conditioned the latch arm 84 for reengagement with the door 62, now causes the lug 88 to again fill the opening 74.

The operation of the bale-forming means or plunger 20 in its cycle of operation continues while the auxiliary or feed-opening-control means represented by the door 62 remains in closed or obstructing position until a subsequent occurrence of the aforesaid conditions in the feeding mechanism. During reciprocation of the plunger 20 without driving of the door 62, the roller 82 rides along the inner face of the door and off and then back onto the door by means of the ramp 90. Movement of the coupling member 76 to door-engaging position is limited by a stop 142 so that the roller cannot project forwardly beyond the end of the ramp 90, thus insuring relatively smooth operation of the plunger while the door 62 is idle.

Apart from this control of the driving connection 74—76 between the door and plunger, the feeding mechanism functions importantly to improve the type of bale formed in the bale chamber 46. As best shown in Figure 2, the transverse section of the bale case shows that the chamber 46 is rectangular rather than square, and that the shorter dimension of the rectangle is measured horizontally. Thus, the distance that the material has to travel between the time it leaves the packers 92 until it reaches the rear wall 40 of the bale case 18 is considerably shorter than it would be were the longer dimension of the bale case rectangle placed horizontally. Therefore, the packers 92 may be designed in such manner that the delivery effect thereof will be sufficient to insure delivery of material completely against the back wall 40, thus avoiding defective bales produced by some balers of known design, which defect in the bales consisted of relatively loose packing of the material, particularly in the upper and lower corners. Additionally, the shorter travel required of the material enables the adaptation to the baler of the feeding mechanism illustrated, that is to the extent characterized by the construction in which the maximum or delivery position of the packers does not require travel of the packers into the bale case. As previously stated, the bale case need not be slotted or otherwise weakened to accommodate the feeding mechanism.

Other features and objects of the invention not specifically enumerated herein will undoubtedly occur to those versed in the art, as will numerous modifications and alterations in the preferred form of the invention illustrated, all of which may be achieved without departing from the spirit and scope of the invention as defined in the appended claims.

What is claimed is:

1. In a baler, the combination of: means including a plurality of walls forming an elongated bale chamber, one of said walls having a feed opening through which material to be baled may be fed into the chamber in a path substantially at right angles to the length of said chamber; a plunger inside and reciprocable lengthwise of the chamber in alternate compression and retracting strokes to move respectively and alternately in opposite directions past the feed opening; sliding door means associated with the wall in which the feed opening is provided and arranged for movement between a normally closed position covering the feed opening and an opened position uncovering the feed opening; drive means selectively connectible and disconnectible between the door means and the plunger, said drive means being normally disconnected to leave the door means in its closed position and operative, when connected, to cause the plunger to open and then release the door means respectively on a retracting stroke and a subsequent compression stroke of said plunger; feeding means outside the chamber for feeding material along the aforesaid path to accumulate material against the closed door means outside the chamber and to move the material through the feed opening when the door means is opened, said feeding means including a feed member movable through a defined feeding cycle and arranged for departure from said cycle in response to a predetermined accumulation of material against the closed door means; means cooperative between the feed member and the drive means and operative incident to departure of the feed member from said cycle to effect connection of the drive means so that the door means is opened by a retracting stroke of the plunger to permit passage of accumulated material into the bale chamber, and is reclosed by the next compression stroke of the plunger; and means for effecting disconnection of the drive means upon return of the door means to closed position.

2. In a baler, the combination of: means including a plurailty of walls forming an elongated bale chamber, one of said walls having a feed opening through which material to be baled may be fed into the chamber in a path substantially at right angles to the longitudinal axis of said chamber; a plunger inside and reciprocable lengthwise of the chamber in alternate compression and retracting strokes to move respectively and alternately in opposite directions past the feed opening; normally idle material-severing means operatively positioned adjacent the feed opening to sever material fed through said opening; drive means selectively connectible and disconnectible between the plunger and the severing means and operative, when connected, to effect operation of the severing means by the plunger and, when disconnected, to leave the severing means idle; means outside the chamber for feeding material toward the feed opening, including a feed member movable through a defined feeding cycle and arranged for departure from said cycle in response to a predetermined operational phase of the feeding means; means cooperative between said feed member and the drive means and effective, in response to departure of said feed member from said cycle, to cause connection of the drive means so that the severing means is operated by the plunger; and means for disconnecting the drive means after a predetermined extent of operation of the severing means.

3. In a material-handling machine, the combination of: means forming a chamber having a feed opening through which material may be fed into the chamber; material-receiving means movable in the chamber in a predetermined cycle to receive and move material fed through the feed opening; feed-opening-control means associated with the chamber means and movable between a normally closed position covering the feed opening and an opened position uncovering said opening; drive means selectively connectible and disconnectible between the material-receiving means and the feed-opening-control means, said drive means being normally disconnected to leave the feed-opening-control means in closed position and operative, when connected, to move the feed-opening-control means from closed position to opened position and return; feeding means for feeding material to the feed opening and operative to accumulate material against the closed feed-opening-control means and to move the material through the feed opening when the feed-opening-control means is in opened position, said feeding means including a feed member movable through a defined feeding cycle and arranged for departure from said cycle in response to a predetermined accumulation of material against the closed feed-opening-control means; means cooperative between said feed member and the aforesaid drive means and operative upon departure of said feed member from said cycle to effect connection of said drive means so that the material-receiving means operates first to move the feed-opening-control means to its opened position to permit passage of accumulated material into the bale chamber and next to move said feed-opening-control means back to its closed position; and means for effecting disconnection of said drive means upon a subsequent return of the feed-opening-control means to its closed position.

4. In a material-handling machine, the combination of: means forming a chamber having a feed opening through which material may be fed into the chamber from outside the chamber: receiving means movable in the chamber in a predetermined operational cycle to receive fed material; normally idle auxiliary material-handling means adjacent the feed opening and operative at times to condition material for receipt by the receiving means; drive means selectively connectible and disconnectible between the auxiliary means and the receiving means and operative, when disconnected, to leave the auxiliary means idle and, when connected, to cause operation of the auxiliary means by the receiving means; feeding means outside the chamber for feeding material to the feed opening and auxiliary means and including a feed member movable in a defined cycle and arranged for departure from said cycle in response to a predetermined phase of operation of the feeding means; means cooperative between the feeding means and the drive means and operative in response to departure of the feed member from its cycle for effecting connection of the drive means so that the auxiliary means is operated by the reseiving means; and means for subsequently disconnecting the drive means and restoring the auxiliary means to an idle status.

5. In a baler, the combination of: means including a plurality of walls forming a bale chamber, one of said walls having a feed opening through which material to be baled may be fed into the chamber; a plunger reciprocable inside the chamber in alternate compression and retracting strokes to move respectively and alternately in opposite directions past the feed opening; door means associated with the wall in which the feed opening is provided and arranged for movement between a normally closed position covering the feed opening and an opened position uncovering the feed opening; drive means selectively connectible and disconnectible between the door means and the plunger, said drive means being normally disconnected to leave the door means in its closed position and operative, when connected, to cause the plunger to first open and then reclose the door means; feeding means outside the chamber to accumulate material against the closed door means outside the chamber and to move the material through the feed opening when the door means is opened, said feeding means including a feed member movable through a defined feeding cycle and arranged for departure from said cycle in response to a predetermined accumulation of material against the closed door means; means cooperative between the feed member and the drive means and operative incident to departure of the feed member from said cycle to effect connection of the drive means so that the plunger first opens the door means to permit passage of accumulated material into the bale chamber and then closes the door means; and means for effecting disconnection of the drive means upon return of the door means to closed position.

6. In a material-handling machine, the combination of: means forming a material-receiving chamber having a feed inlet through which material may be fed into the chamber from outside the chamber; control means associated with the feed inlet and selectively positionable to restrict or open the feed inlet; feeding mechanism for feeding material from outside the chamber in a direction toward the chamber for accumulation of such material in the feed inlet when said inlet is restricted by the control means, said feeding mechanism including a feed element movable in a defined cycle including a phase in which said element moves in said feeding direction to a maximum position closely adjacent but outside the chamber, said feeding mechanism further including means providing for temporary displacement of said element in a direction opposite to said feeding direction to a position more remote from the chamber in response to accumulation of material between said element and the control means when the control means is in inlet-restricting position, and force-applying means for forcibly urging said element from such displaced position to said maximum position upon removal of the restriction caused by said control means; actuating means for changing the control means from restricting position to open position and return, and including selectively connectible and disconnectible parts disconnected while the control means is in inlet-restricting position; and means associated between the feed mechanism and the actuating means and operative in response to displacement of the feed-element because of a predetermined accumulation of material as aforesaid for effecting connection of said parts and thereby to cause change of position of the control means so that the force-applying means of the feeding mechanism is effective to move the feed element to its maximum position and thereby to propel said accumulation of material through the feed opening and into the chamber.

References Cited in the file of this patent

UNITED STATES PATENTS

| Number | Name | Date |
|---|---|---|
| 649,413 | Luzzatto | May 8, 1900 |
| 736,496 | Colman | Aug. 18, 1903 |
| 750,324 | Tuttle | Jan. 26, 1904 |
| 968,650 | Gilleland | Aug. 30, 1910 |
| 1,029,422 | Cashon | June 11, 1912 |
| 1,031,603 | Welger | July 2, 1912 |
| 1,071,020 | Bartholomew | Aug. 26, 1913 |
| 1,124,354 | Stewart | Jan. 12, 1915 |
| 1,201,695 | Case | Oct. 17, 1916 |
| 1,231,354 | Hilton | June 26, 1917 |
| 1,714,331 | Tyler | May 21, 1929 |
| 2,158,745 | Dalimata | May 16, 1939 |